Figure 1:
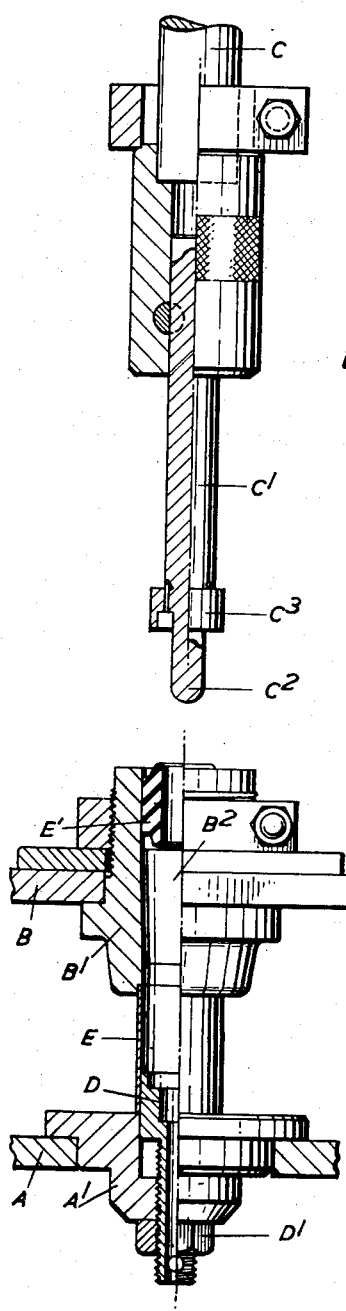

April 10, 1956  P. C. HUTTON  2,741,021
APPARATUS FOR ASSEMBLING FLEXIBLE BEARINGS
Filed Nov. 21, 1951  2 Sheets-Sheet 1

Inventor
PHILIP CHARLES HUTTON
By Emery, Holcombe & Blair
Attorney

April 10, 1956  P. C. HUTTON  2,741,021
APPARATUS FOR ASSEMBLING FLEXIBLE BEARINGS
Filed Nov. 21, 1951  2 Sheets-Sheet 2

Inventor

PHILIP CHARLES HUTTON

By Emery Holcombe & Blair
Attorney

United States Patent Office

2,741,021
Patented Apr. 10, 1956

2,741,021

APPARATUS FOR ASSEMBLING FLEXIBLE BEARINGS

Philip Charles Hutton, London, England, assignor to Silentbloc Limited, London, England, a company of Great Britain Application November 21, 1951, Serial No. 257,445

Claims priority, application France February 16, 1951

2 Claims. (Cl. 29—235)

The present invention relates to an apparatus for and method of assembling flexible bearings of the general type consisting of an outer member having a cylindrical bore, and an externally cylindrical inner member lying within but spaced by a cylindrical space from the surface of such bore (these parts being for convenience herein referred to as inner and outer concentric cylindrical sleeves) in the space between which lies a radially compressed and axially elongated yielding bushing of rubber or like deformable resilient material, and is particularly but not exclusively applicable to the assembling of flexible bearings of the above type in which the bushing has end portions which project beyond the ends of the outer sleeve and are thus not radially compressed, as described for example in the specification of United States patent specification No. 2,517,791. For convenience flexible bearings of this latter kind will be referred to herein as of the extended bushing type.

The invention is concerned with apparatus by which after inserting the rubber bushing within the outer sleeve the inner sleeve is forced into the bore of the bushing preceded by a tapered plunger. It has been found that in order that the rubber bushings in bearings of the type referred to shall be in the condition best suited to satisfactory operation and length of service, as well as to ensure correct initial location of the bushing relatively to the inner and outer members, it is desirable to provide a yielding abutment for one end of the rubber bushing during the operation of inserting the inner sleeve within the outer sleeve preceded by the tapered plunger, and one form of apparatus and method of assembly incorporating this feature is described in the specification of United States patent specification No. 2,550,564.

The present invention aims at providing a still further improved apparatus and method for performing the last assembly operation of flexible bearings of the type referred to.

According to the present invention apparatus for inserting the inner sleeve of a flexible bearing of the type referred to comprises a press, means for holding the outer sleeve with the rubber bushing assembled within it in one part of the press, means on the other part of the press for forcing the inner sleeve preceded by a tapered plunger or expander into the outer sleeve so that as the press closes the tapered plunger will enter the hole in the rubber bushing in advance of the inner sleeve and expand the hole sufficiently to permit entry of the inner sleeve and two separate annular yieldable abutments in the first-mentioned part of the press arranged respectively to engage the radially outer portions of the two ends of the rubber bushing so as to exert upon the ends of the rubber bushing axial forces tending to resist the axial movements of the ends of the rubber bushing during the passage of the tapered plunger or expander through the bushing and the insertion of the inner member therein.

The invention is, as stated, particularly applicable to the assembling of flexible bearings of the extended bushing type in which the bushing has end portions which project beyond the ends of the outer sleeve and are not radially compressed, and when the invention is applied to apparatus for inserting the inner sleeve of a flexible bearing of this type the internal diameter of each of the yielding annular abutments is conveniently appreciably greater than the external diameter of the inner sleeve so as to provide an annular space to accommodate each end portion of the bushing. Moreover the internal diameter of each of the annular abutments in this case is preferably such in relation to the external diameter of the inner sleeve that at the end of the assembly operation and before removal of the bearing from the press each of the extended ends of the bushing is somewhat radially compressed and axially elongated between the abutments and the adjacent ends of the inner sleeve. It is found that in this way both the accuracy of assembly and the condition of the uncompressed end portions of the bushing in the finally assembled bearing tends to be improved.

In any case in apparatus according to the invention the abutments are conveniently spring-pressed and means are preferably provided whereby the effective force of the spring or springs acting upon one or each of the abutments can be adjusted.

Figure 2:
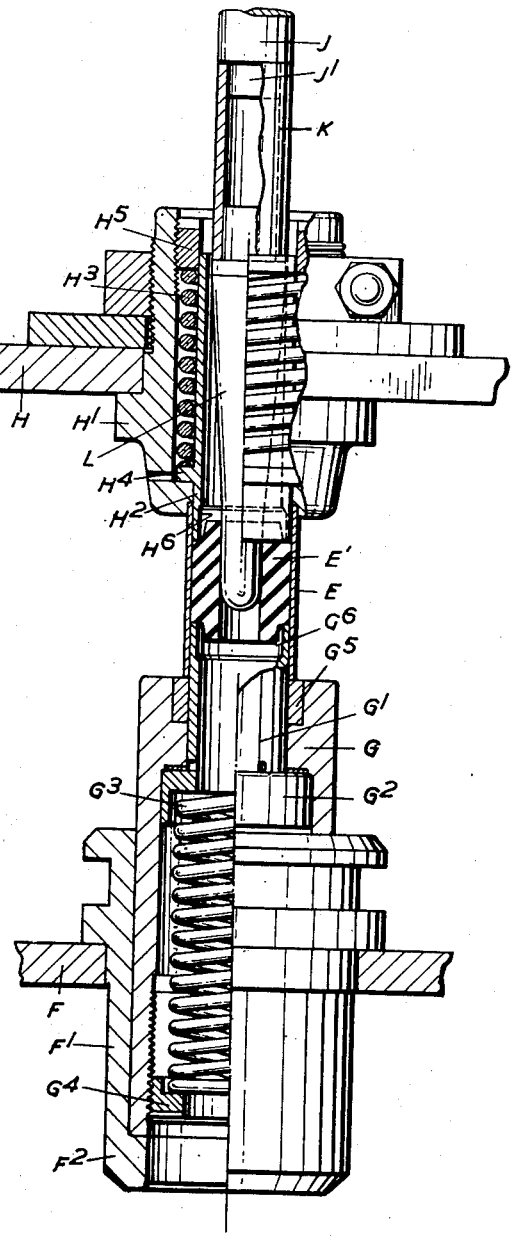
Figure 3:
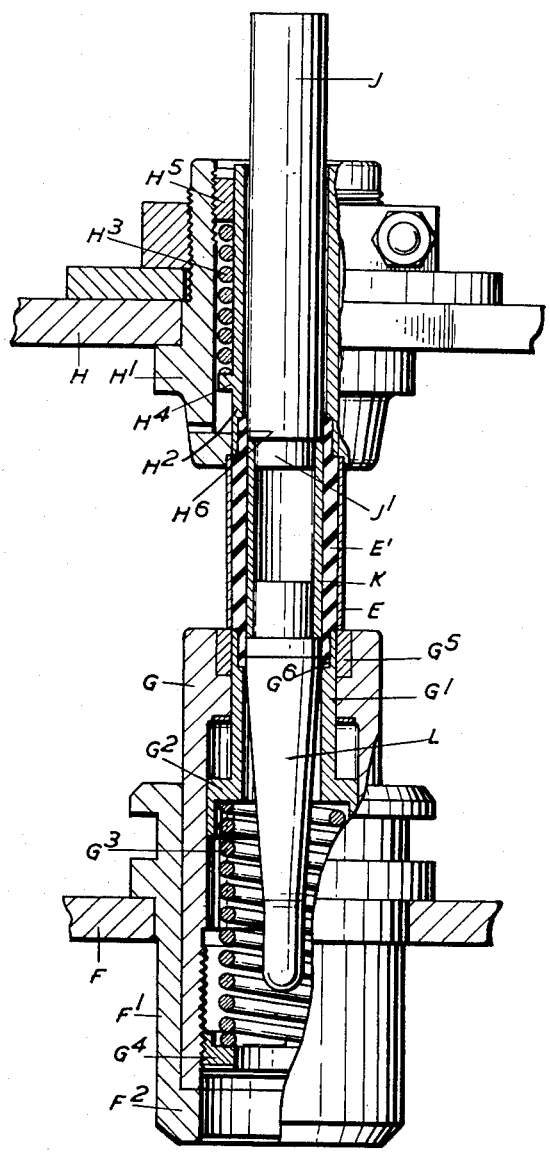

The invention may be carried into practice in various ways but the appropriate parts of one form of assembly apparatus incorporating the present invention are illustrated by way of example in the accompanying drawings, in which Figure 1 shows partly in elevation and partly in cross-section apparatus of known type for inserting each rubber bushing into the correct position within the outer sleeve of the bearing, Figure 2 is a similar view to Figure 1 on an enlarged scale showing apparatus according to the invention for performing the final assembly operation of inserting the inner sleeve into the bushing with the parts in the position they occupy immediately before the actual assembly operation, and Figure 3 is a similar view to Figure 2 of the assembly apparatus showing the parts in the position they occupy at the end of the assembly operation but before the various parts of the assembly apparatus have been withdrawn and ejected from the bearing.

The apparatus shown in Figure 1 for carrying out the first assembly operation and itself forming no part of the present invention, comprises a press having a bed A in a hole in which is mounted a platen $A^1$, a vertically movable upper platen B in a hole which secured a combined guide and clamp member $B^1$, and a plunger C, conveniently pneumatically operated in known manner, carrying a pusher $C^1$ having an end $C^2$ of reduced diameter, and a collar $C^3$.

Adjustably mounted within the platen $A^1$ is a combined locating member and abutment D which it will be seen can be adjusted vertically and locked in its position of adjustment by a nut $D^1$. In operation the upper platen B is raised and the outer sleeve E of the bearing to be assembled is placed over the upper end of the abutment member D as shown with which it makes a close but free fit so that the lower end of the outer sleeve E rests upon the platen $A^1$. The upper platen B, which is provided with a tapered bore $B^2$ the lower end of which is of approximately the same diameter as the bore of the sleeve E and is provided with a shallow annular recess to receive the upper end of the sleeve E, is then lowered into the position shown in Figure 1 so that the sleeve E is gripped and located between the clamp member $B^1$ and the lower platen $A^1$. A rubber bushing $E^1$ is now placed within the upper large diameter end of the bore $B^2$ of the clamp member $B^1$, and the plunger C is then forced downwards so as to force the bushing $E^1$ through the tapered bore $B^2$ into the outer sleeve E, the correct final position of the bushing E¹ being determined by the position of the abutment or stop member D. The plunger C and the upper platen B are then raised and the outer sleeve E is removed from the press together with the bushing E¹, when the bushing will occupy an intermediate position therein.

The next or final assembly operation is effected in the holding and pressing apparatus shown in Figures 2 and 3. This apparatus comprises a press having a stationary platen or bed F in a hole in which is disposed a tubular support F¹ having a shoulder F² at its lower end against which rests the lower end of a tubular guide member G fitting closely within the support F¹. The tubular guide member G has a small diameter bore at its upper end in which freely slides an abutment member, hereinafter called the lower abutment member G¹, and a larger diameter bore below the small diameter bore in which slides a guide part G² which is formed integral with the abutment member G¹ and upon which acts the upper end of a compression spring G³ the lower end of which bears against an adjustable thrust ring G⁴ which is externally screw-threaded and engages a screw-thread in the lower end of the bore of the guide member G. As shown, the lower abutment member G¹ projects above the upper end of the guide member G, while a hardened ring G⁵ forms the upper end portion of the bore in which the lower abutment member G¹ slides.

Arranged to be movable vertically above the press bed F is an upper platen H having fixedly mounted in a hole therein a tubular member H¹ formed to act both as a gripping member and as a guide for an upper abutment member. Thus, the member H¹ is provided at its lower end with a small diameter bore in which slides the lower end portion of a tubular upper abutment member H², while the remainder of its bore is of larger diameter and contains a compression spring H³ acting at its lower end on a flange H⁴ on the upper abutment member H², and at its upper end upon an adjustable thrust ring H⁵ which also acts as a guide for the upper end of the upper abutment member H², the thrust ring H⁵ being externally screw-threaded to engage a screw thread in the upper end of the bore of the gripping and guide member H¹. Thus the platens F and H and the associated parts described above together constitute the gripping and holding section of the press which remains stationary during the final assembly operation although the platens F and H are separable vertically to permit insertion of the parts to be assembled and withdrawal of the assembled parts after final assembly.

The upper part of the press comprises a ram member J arranged to be moved vertically as by pneumatic pressure in a manner well known in the press art and formed at its lower end with a projection J¹ for engagement with the upper end of the inner sleeve K of the bearing to be assembled, while a tapered expander L is applied to the lower end of the inner sleeve K in a generally known manner as shown.

The operation of the apparatus is as follows.

Initially the part H is raised sufficiently above the bed F to permit the outer sleeve E with the bushing D assembled therein to be applied to the upper end of the abutment member G¹ so that its lower end rests upon the hardened ring G⁵. The upper platen H is then lowered so that the outer sleeve E is gripped between the gripping member H¹ and the lower guide member G while being located by the adjacent ends of the abutment members H² and G¹ which it will be seen engage the annular faces at the ends of the intermediate part of the bushing E¹ which in the finally assembled bearing is to be radially compressed. At this time the ram J occupies an upper position sufficiently above the upper platen H to permit the inner sleeve K with its associated expander L to be inserted within the upper abutment member H². It will be seen that the lower abutment member G¹ is provided with an annular internal recess G⁶ at its upper end, while the upper abutment member H² is provided with an annular internal recess H⁶ at its lower end, which recesses have diameters somewhat greater than the external diameter of the inner sleeve K.

The ram J is then operated to force the inner sleeve K into position within the bushing E¹ preceded by the expander L, and during this operation the intermediate part of the bushing E¹ will be radially compressed and axially elongated, the axial movement of each of its annular end faces relatively to the outer sleeve E during this operation being controlled respectively by the abutment members G¹ and H². The springs G³ and H³ are so adjusted in relation to the speed of operation of the ram J and the dimensions and characteristics of the parts being assembled as to ensure as far as possible that at the end of this operation the axial position of the bushing D as a whole within the outer sleeve and relatively to the inner sleeve will be central.

Moreover the dimensions of the annular recesses G⁶ and H⁶ are such that at the end of this operation the end portions of the bushing, which in the finished bushing are not radially compressed but extend beyond the ends of the outer sleeve, will fill the recesses and themselves be radially compressed to some degree, thus still further ensuring correct location of the bushing relatively to the inner and outer sleeves, and moreover tending to ensure that these end portions are in the most satisfactory condition in the finally assembled bearing. Thus is will be seen that if these bushing end portions were merely forced along the end portions of the inner sleeve during the final assembly operation there would be a tendency for them to turn inwards, and they might in fact be materially internally distorted or stressed in their final state. By elongating them by radial compression during assembly, however, they automatically draw back into their correct positions when the upper platen H is raised and the assembled bearing is removed from the apparatus.

In Figure 3 the parts are shown in the positions they occupy precisely at the end of the final assembly operation with the expander L still associated with the lower end of the inner sleeve K. In practice, however, at the end of this assembly operation the expander L is automatically carried by its momentum and by gravity down through the guide G and escapes from the lower end of the support F¹ where it is collected for subsequent use in assembling further bearings.

What I claim as my invention and desire to secure by Letters Patent is:

1. Apparatus for inserting the inner sleeve of a flexible bearing of the type consisting of inner and outer sleeves between which a rubber bushing having projecting exposed ends is radially compressed except for its projecting end portions, said apparatus comprising a press having relatively movable platens and a pressure ram, means for holding the outer sleeve with the rubber bushing assembled within it between said platens, means on the ram for forcing the inner sleeve preceded by a taper plunger into the outer sleeve so that as the press closes the tapered plunger will enter the hole in the rubber bushing in advance of the inner sleeve and expand the hole sufficiently to permit entry of the inner sleeve, and two separate yieldable annular abutments mounted one on each platen and arranged respectively to engage the radially outer portions of the two ends of the rubber bushing so as to exert upon these ends opposing axial forces tending to resist axial movement of the rubber bushing with respect to the outer sleeve during the passage of the tapered plunger through the bushing and the insertion of the inner sleeve member therein, the internal diameter of each abutment being appreciably greater than the external diameter of the inner sleeve so as to provide an annular space between each abutment and the sleeve to accommodate each end portion of the bushing, the internal diameter of the abutment being such in relation to the external diameter of the inner sleeve and the dimensions of the bushing as not to contain the entire original volume of uncompressed rubber forced into it at the end of the assembly operation and before removal of the bearing from the press whereby each of the end portions of the bushing is somewhat radially compressed and axially elongated between its adjacent abutment and the adjacent end of the inner sleeve.

2. Apparatus for inserting the inner sleeve of a flexible bearing of the type consisting of inner and outer sleeves between which a rubber bushing having projecting exposed ends is radially compressed except for its projecting end portions, said apparatus comprising a press having relatively movable platens and a pressure ram, means for holding the outer sleeve with the rubber bushing assembled within it between said platens, means on the ram for forcing the inner sleeve preceded by a taper plunger into the outer sleeve so that as the press closes the tapered plunger will enter the hole in the rubber bushing in advance of the inner sleeve and expand the hole sufficiently to permit entry of the inner sleeve, and two separate yieldable annular abutments mounted one on each platen and arranged respectively to engage the radially outer portions of the two ends of the rubber bushing so as to exert upon these ends opposing axial forces tending to resist axial movement of the rubber bushing with respect to the outer sleeve during the passage of the tapered plunger through the bushing and the insertion of the inner sleeve member therein, springs acting in opposite directions on the annular abutments to force them into engagement with the ends of the bushings, the internal diameter of each abutment being appreciably greater than the external diameter of the inner sleeve so as to provide an annular space between each abutment and the sleeve to accommodate each end portion of the bushing, the internal diameter of the abutment being such in relation to the external diameter of the inner sleeve and the dimensions of the bushing as not to contain the entire original volume of uncompressed rubber forced into it at the end of the assembly operation and before removal of the bearing from the press whereby each of the end portions of the bushing is somewhat radially compressed and axially elongated between its adjacent abutment and the adjacent end of the inner sleeve.

References Cited in the file of this patent

UNITED STATES PATENTS

| | | |
|---|---|---|
| 1,884,155 | Oestnaes et al. | Oct. 25, 1932 |
| 1,913,933 | Lamborn et al. | June 13, 1933 |
| 2,550,564 | Hutton | Apr. 24, 1951 |

FOREIGN PATENTS

| | | |
|---|---|---|
| 625,310 | Great Britain | June 24, 1949 |